United States Patent [19]

Goodwin et al.

[11] Patent Number: 4,848,501
[45] Date of Patent: Jul. 18, 1989

[54] AIR CUSHION VEHICLE

[76] Inventors: Matthew Goodwin; William Goodwin, both of 19727 Cass Ave., Mt. Clemens, Mich. 48044

[21] Appl. No.: 46,676

[22] Filed: May 7, 1987

[51] Int. Cl.[4] ............... B60V 1/04; B60V 1/14; B60V 1/16
[52] U.S. Cl. .................... 180/117; 180/120; 180/128
[58] Field of Search ............ 180/120, 121, 127, 128, 180/117

[56] References Cited

U.S. PATENT DOCUMENTS

| 3,379,271 | 4/1968 | Hopkins et al. | 180/128 |
|---|---|---|---|
| 3,397,753 | 8/1968 | Hunt et al. | 180/127 |
| 3,540,542 | 11/1970 | Hopkins | 180/127 |
| 3,561,558 | 2/1971 | Parkhouse | 180/120 |
| 3,599,746 | 8/1971 | Davis et al. | 180/127 |
| 3,756,343 | 9/1973 | Joyce, Jr. | 180/127 |
| 3,776,360 | 12/1973 | Anders et al. | 180/127 |
| 3,891,047 | 6/1975 | Rapson | 180/117 |
| 3,918,548 | 11/1975 | Dyke | 180/117 |
| 3,921,753 | 11/1975 | Pont | 180/127 |
| 3,951,227 | 4/1976 | Lafont | 180/121 |
| 4,258,817 | 3/1981 | Hunt | 180/127 |

FOREIGN PATENT DOCUMENTS 2271967  12/1975  France ................ 180/120

*Primary Examiner*—John A. Pekar
*Attorney, Agent, or Firm*—Basile Hanlon

[57] ABSTRACT

A small sized air cushion vehicle includes a hull having a planar bottom surface with an upstanding lower flange disposed and extending upwardly at an angle of between 24° and 30° with respect to the planar bottom surface of the hull. A hollow plenum extends through the periphery of the hull. Apertures are formed in the upstanding lower flange of the hull and disposed in fluid flow communication with corresponding apertures in a plurality of inflatable members which are attached to the flange of the hull. Each inflatable member includes a downwardly extending aperture which directs air flow from the hollow plenum in the hull through each of the inflatable members to lift the vehicle a short distance above an underlying surface as well as providing forward or sideways propulsion. A steering mechanism is mounted rearward of the fluid propulsion source to control the direction of movement the vehicle. The occupant seating area includes a seat longitudinally movable and lockable within the vehicle for occupant comfort as well as for forward positioning during lift-off to control weight distribution in the hovercraft.

10 Claims, 10 Drawing Sheets

AIR CUSHION VEHICLE

BACKGROUND OF THE INVENTION

1. Field of the Invention

The present invention relates, in general, to air cushion or ground effect vehicles and, more particularly, to a small-sized air cushion vehicle

2. Description of the Prior Art

Fluid cushioned vehicles which are suspended a slight distance above an underlying ground or water surface by pressurized fluid flow output beneath such vehicles are well known. Technically, an inflatable skirt formed of a flexible material, such as rubber, plastic, etc., is mounted beneath the vehicle about its periphery and directs fluid flow from a motive source, such as a fan mounted on the vehicle, through the inflatable skirt against the underlying ground or water surface to both raise the vehicle a short distance, such as nine to twelve inches, above the underlying surface as well as propelling and providing thrust rearward of the vehicle for forward or sideway movements as controlled by a steering mechanism.

Large-sized, air cushions vehicles have been devised for multiple passenger and freight use, such as in passenger ferry applications, as well as a small sized versions for use by one or two people. However, in the smaller sized vehicles designed for one or two people, lift becomes a major design factor due to the lack of a large size surface on the vehicle against which the fluid flow force may be directed against the underlying surface of the vehicle and the ground or water surface. Previously devised individual or small sized air cushion vehicles have utilized a sharply angled upward surface approaching 90° on the sides of flanges adjacent the periphery of the vehicle. This has resulted in a low amount of lift, requires greater motive source and air flow and necessitates a larger sized vehicle due to the weight required by the larger sized motor and air source.

Thus, it would be desirable to provide an small sized air cushion vehicle having lift sufficient to easily raise the vehicle a slight distance above the underlying ground or water surface or movement of the vehicle. It would also be desirable to provide a small sized air cushion vehicle having enhanced mobility over previously devised small sized vehicle.

SUMMARY OF THE INVENTION

The present invention is a small sized air cushion vehicle for air travel above a ground or water surface. The air cushion vehicle includes a hull with a motor operated fluid propulsion source, such as a fan, which directs pressurized air flow through a plenum chamber formed in the hull to individual, separated inflatable members attached to the periphery of the hull. The hull has a flat, planar bottom surface with a lower upstanding flange disposed at an angle between 24° and 30° with respect to the planar bottom surface of the hull.

A fluid, such as air, is directed from the fan through the plenum to the plurality of inflatable members, such as hollow bags, attached to the circumference of the hull in registry with the lower flange of the hull. This directs the fluid flow against the surface beneath the vehicle to provide a high degree of lift to raise the vehicle above the surface.

An air directive flow means or rudder is mounted on the vehicle and includes a plurality of plates pivotally mounted rearward of the propulsion means and linkingly connected to a steering mechanism operable by the operator of the vehicle which is located adjacent the operator's seat in the vehicle. The plates are laterally movable via a linkage connected to the steering mechanism to change the directional angle of the fluid flow from the propulsion means during movement of the hovercraft. A splitter plate, which may be vertically adjustable, is mounted rearward and below a portion of the propulsion means to direct a portion of the fluid flow into the plenum.

Due to the low acute angle of the lower flange of the hull, greater lift may be achieved by the air cushion vehicle of the present invention over previously devised small-sized air cushion vehicle designed for single or multiple individual use due to the increased lift area against which the fluid flow acts between the underlying surface and the lower side flange and bottom surface of the hull of the vehicle.

The present air cushion vehicle overcomes the limitations of previously devised small sized vehicle by providing a greater lift surface adjacent the periphery of the air cushioned vehicle thereby enabling a smaller sized and therefore a lighter weight motor and fluid flow source to be utilized to provide the necessary lift and propulsion of the vehicle.

The occupant seat is also longitudinally adjustable on the bottom surface of the hull. This is particularly important during lift-off since the air cushion vehicle of the present invention has most of its weight located rearward of the occupant. Forward movement of the operator seat increases the weight of the forward portion of the vehicle thereby maintaining the vehicle in a substantially horizontal position providing increased lift during lift-off. The seat may be moved rearward after lift-off since forward propulsion of the vehicle eliminates upward movement of the forward end of the vehicle during forward or sideways movements.

The individual inflation members or bags also provide efficient movement of the vehicle when the vehicle encounters upstanding objects, such as rocks, etc., since the individual bags may deform separately when such obstacles are encountered, but lift is still maintained at an efficient rate since a substantial portion of the remaining bags remain intact in an inflated state. This is substantially different from previously devised large or small sized air cushion vehicles which a peripheral skirt of a single inflatable member or multiple, attached members is employed. Encountering an obstacle, such a skirt will substantially deform thereby decreasing lift along a larger portion of the vehicle.

DESCRIPTION OF THE PREFERRED EMBODIMENTS

Figure 1:
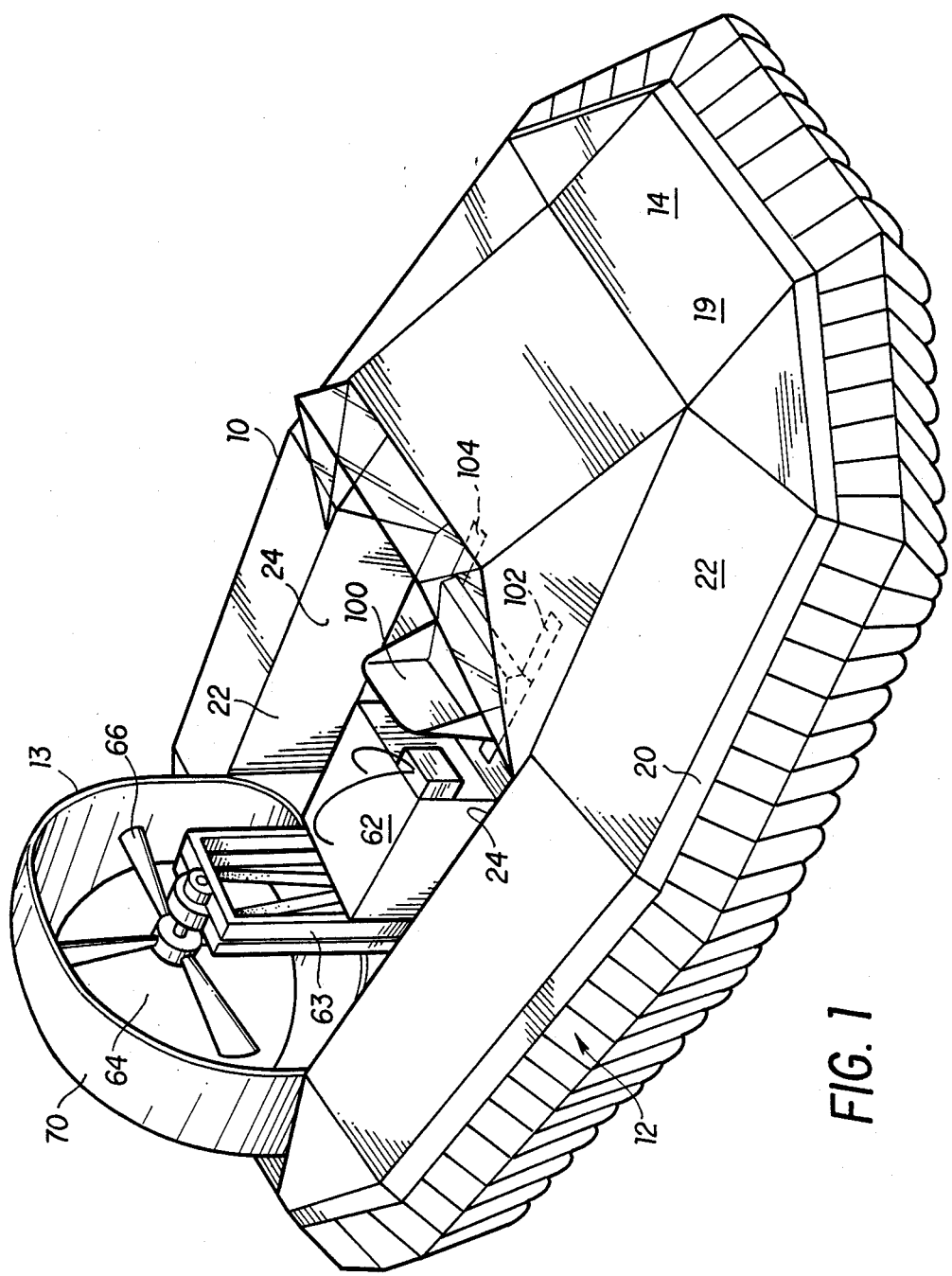
FIG. 1 is a perspective view of the air cushion vehicle of the present invention.

Throughout the following description, the same reference number will be used to refer to the same component shown in multiple figures of the drawing.

Figure 2:
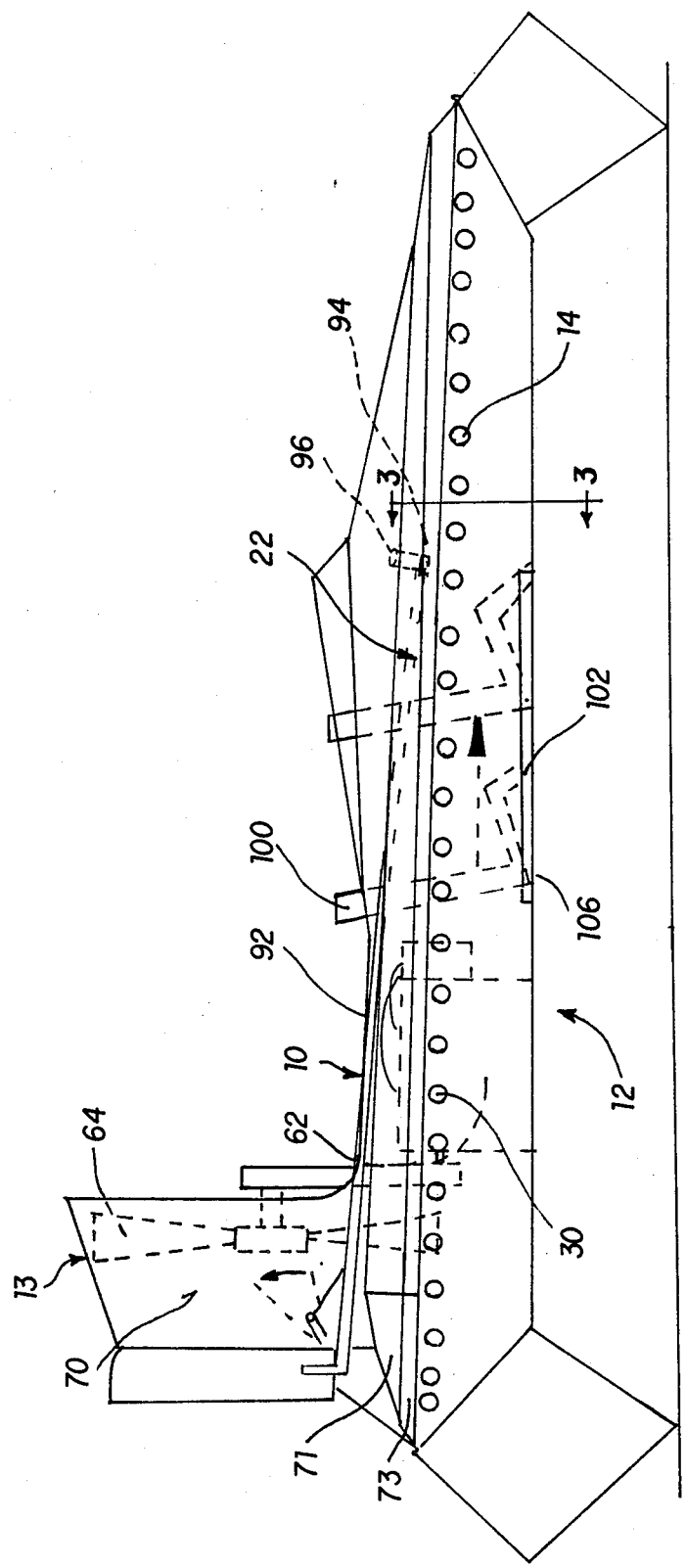
FIG. 2 is a side elevational view of the air cushion vehicle shown in FIG. 1.

In general, the present invention, as illustrated in FIGS. 1 and 2 is a small-sized, individually operated air cushion vehicle 10 utilizing air flow directed through the peripheral bottom surface of the craft 10 through fluid inflatable members 12 against an underlying ground or water surface to lift the vehicle 10 a short distance, such as 9 to 12 inches, above such surface with propulsion in forward and/or sideways directions provided by a motive operated propulsion source 13 mounted on the rear portion of a hull 14.

The hull shown in FIGS. 1–7 includes a planar bottom surface 16 and a lower, upstanding flange 18 disposed at a predetermined angle between 24° to 30° with respect to the planer bottom surface 16. Preferably, the lower upstanding flange 18 is disposed at an acute, upwardly extending angle of 27° from the bottom planar surface 16 of the hull 14.

The hull 14 also includes generally planar sides 15 which extend from a flat back wall 17 to an inwardly tapered front portion 19. The front portion 19 has a smaller lateral cross-section than the rear section to enable greater maneuverability of the vehicle 10; while the rear portion presents a greater surface area to the underlying surface and, therefore, greater stability for the hovercraft 10.

An upstanding upper flange member 20 is formed on the hull 14 and is disposed at an approximate 60° angle with respect to the lower flange member 18. An upper surface 22 extends integrally therefrom and circumferentially surrounds a cockpit 22 formed by upstanding side walls 24 in a forward portion of the hull 14. The side walls 24 extend vertically upward from the bottom planar surface 16 as shown in FIG. 1.

The upstanding side walls 24, the upper surface 22, the upstanding vertical flange 20, the lower upstanding flange 18 and the outboard portion of the planar bottom surface 16 of the hull define a hollow plenum or fluid flow chamber 26 about the periphery of the hull 14 for fluid flow, such as air, therethrough.

The plenum 26 includes a plurality of apertures 30 formed in the lower flange 18 of any desired shape, such as rectangular, circular, etc. The apertures 30 are disposed in fluid flow communication with the interior of the separate inflatable members 12 through apertures 32 formed in one end of each inflatable member 12.

Figure 3:
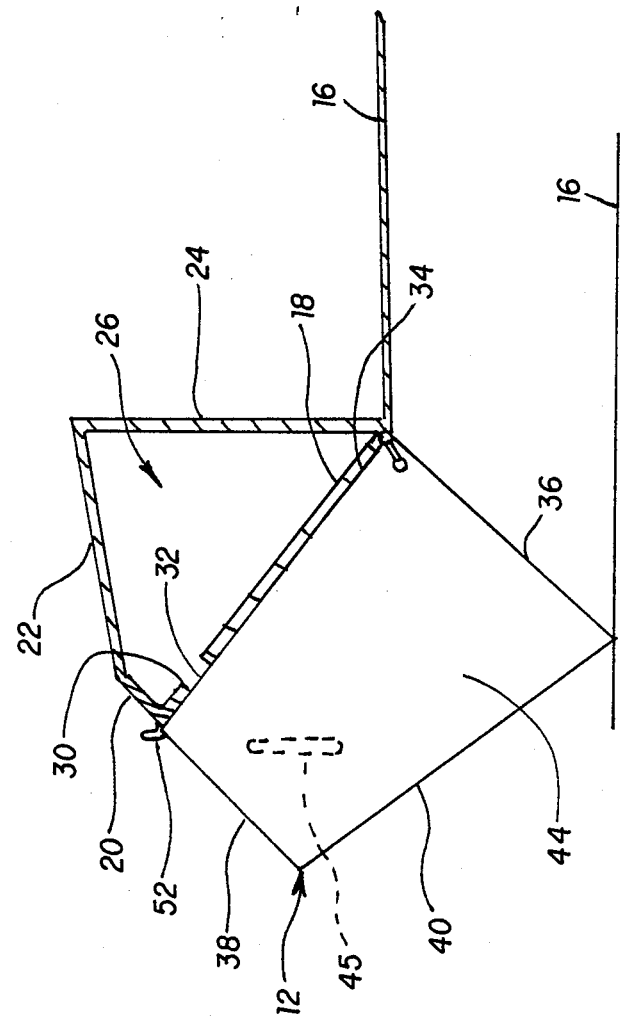
FIG. 3 is a perspective, partially cross-sectioned view showing one of the side of the inflatable members employed in the present invention.
Figure 4:
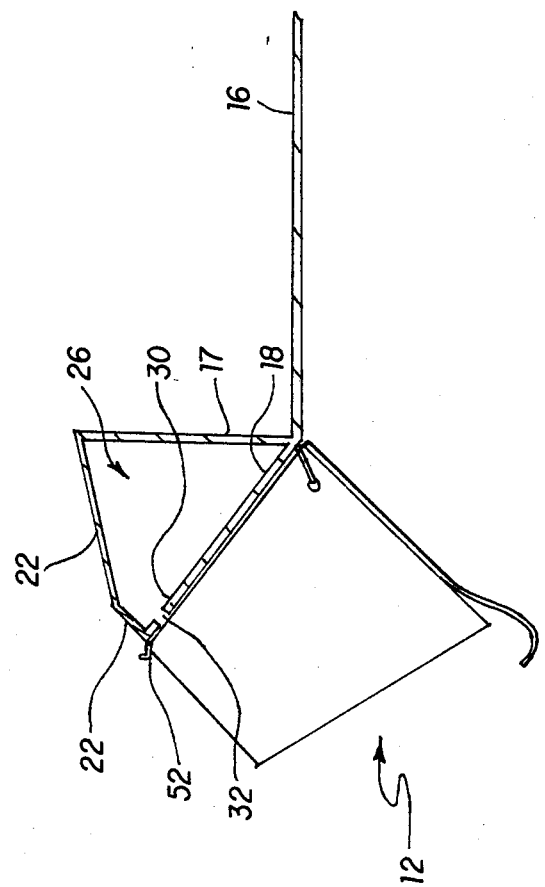
FIG. 4 is a perspective view of a rear mounted inflatable member.
Figure 6:
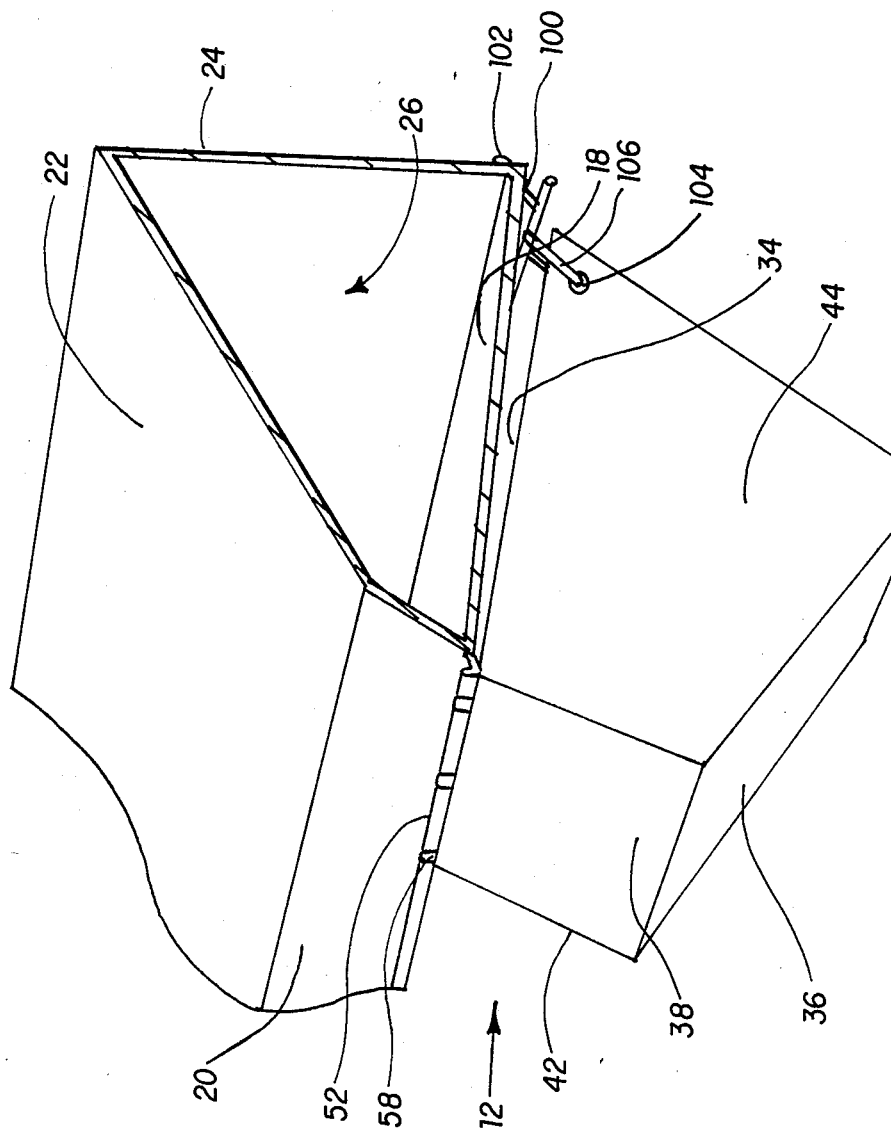
FIG. 6 is a perspective view illustrating the attachment of an inflatable member to the hull.

As shown more clearly in FIGS. 3 and 6, each of the front and side mounted inflatable members 12 has a generally rectangular shape, by way of example only and not limitation, and are formed of a top surface 34, a bottom surface 36, front and back ends 38 and 40 and opposed side walls 42 and 44.

The bottom surface 36 is preferably open for admitting air flow through the aperture 32 formed in the top surface 34 which is disposed in fluid flow communication with the aperture 30 in the lower flange 18 of the plenum 26.

A deflector plate 45 is mounted within the interior of each inflatable member 12 and comprises a planar member, typically of rigid cloth, which is spaced from the top end surface 34 of each inflatable member 12 and extends between and is secured to the side walls 42 and 44 of each inflatable member 12. The deflector plate 45 is mounted intermediate the aperture 32 and the open bottom surface 36 to deflect air to create a high air flow across the top surface of deflector plate 45 and the lower portion of the inflatable member 12 below it to maintain the inflatable member 12 in an inflated state.

Figure 7:
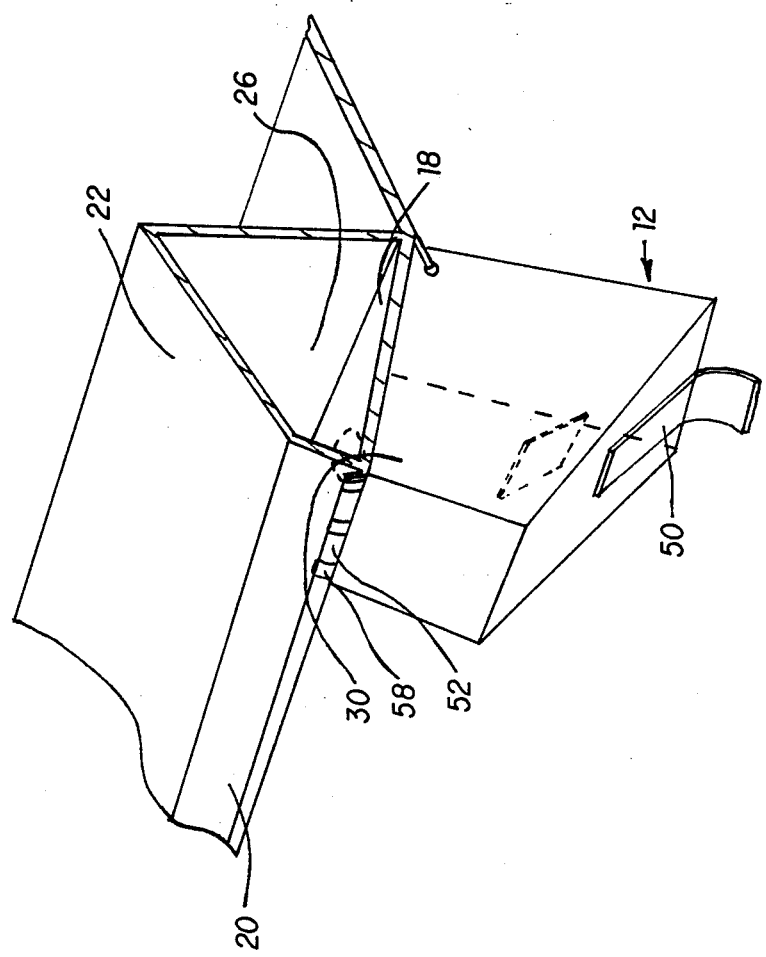
FIG. 7 is a perspective view of an inflatable member mounted on the rear end of the air cushion vehicle.

FIG. 7 illustrates an inflatable member 12 mounted on the rear portion of the vehicle 10. The inflatable member 12 is configured identical to the bag 12 shown in FIG. 3 with an internal deflector member 45, but also includes an outer flap 50 attached to the outboard end 38 of the inflatable member 12. The flap 50 extends downward and outward therefrom due to the inclination of the mounting of the inflatable member 12 to the upstanding flange of the hull 14 to prevent upward flow of debris from the surface underlying the vehicle 10 into the occupant area during lift-off.

As shown in FIGS. 3, 4, 6 and 7, all of the inflatable members 12 include an upper flap member 52 which extends upward from one end 38 of each inflatable member 12. A plurality of clamps 58 as shown in FIGS. 6 and 7 which comprise a U-shaped spring-type clip are disposable over the flap 52 on each inflatable member 12 to secure the inflatable members 12 to an outer flange formed on the hull 14.

As shown in FIG. 6, means 100 is provided for maintaining the correct orientation of each of the inflatable members 12 on the vehicle 10. In a preferred embodiment, the orientation maintaining means 100 comprises an elongated cable 102 which extends completely around the periphery of the vehicle 10 adjacent the top surface of each inflatable member 12 and the bottom lower flange 18 on the hull 14. Each of the inflatable members 12 is provided with spaced eyelets 104 in the opposed side walls 42 and 44. A connector 106 such as a cable, is looped through each eyelet 104 and around the cable 102. The cable 106 can be tightened by conventional means, such as turnbuckels, etc., to maintain tension on the inflatable members 12 and to prevent any movement when the vehicle 10 strikes objects.

Figure 5:
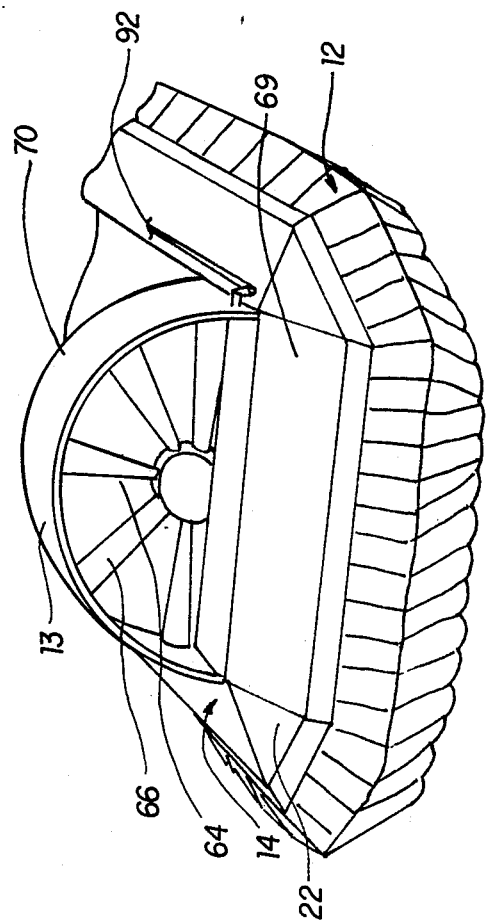
FIG. 5 is a perspective view looking rearward into the propulsion means.

The vehicle 10 also is provided with propulsion means denoted in general by reference number 13 in FIG. 1. The propulsion means 13 as shown in FIGS. 1, 2 and 5 includes a motive source 62, such as a conventional internal combustion, fuel driven motor, controlled by a throttle which regulates the amount of engine output revolutions. The output shaft of the motor 62 is connected by belts 63 to a fan 64 having a plurality of blades 66 radially extending from a central hub operatively connected to the output shaft of the motor 62.

As shown in FIG. 5, the blades 66 of the fan 64 are mounted so that the bottom edges extend a short distance below the upper surface of the rear portion of the hull 14. A rear positioned aperture, not shown, is formed in the hull 14 in a rear sloping portion 69 in communication with the apertures 30 mounted in the rearward portion of the hull 14. The propulsion means 13 directs fluid or air flow into the plenum chamber 26 through the rear portion 69 of the hovercraft 10 to inflate the members 12 attached in fluid flow communication to the apertures 30 upon rotation of the blades 66 of the fan 64. The blades 66 are surrounded by a circular-shaped shroud 70 which is mounted on the upper surface of the hull 14 as shown in FIGS. 1 and 5.

The air from the fan 64 is directed through a fluid direction means 71 in the form of a splitter plate as shown in FIG. 2, which is fixedly mounted at the lower portion of in the hull 14. The splitter 71 is a planar member disposed at an upwardly extending angle with respect to the bottom portion of the hull 14 to deflect a portion of the air from the fan 64 into the plenum 26 to inflate the inflatable members 12; while deflecting larger amounts of air rearward through the shroud 70 for forward propulsion of the hovercraft 10.

It should also be understood that the splitter plate 71 can be variably mounted on the hull 14 by attaching a hinge at its lower end 73 and attaching a conventional linkage with an operative handle located near the operator of the hovercraft 10 to enable the splitter plate 71 to be pivoted between the position shown in FIG. 2, which depicts normal forward thrust of the hovercraft 10, to a raised position in which the splitter plate 71 is substantially vertical to block a greater portion of the air passing rearward of the hovercraft 10 for increased upward force during lift-off and/or maneuvering of the hovercraft 10.

Figure 8:
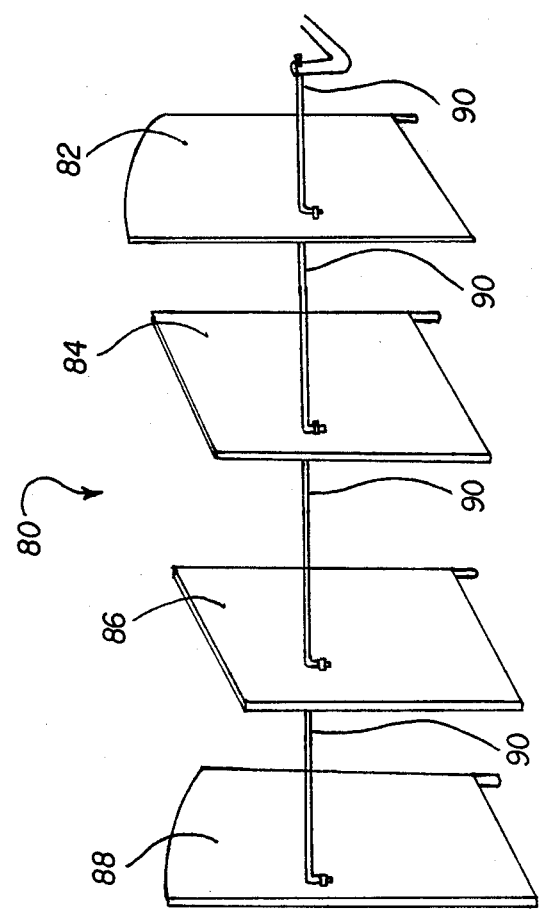
FIG. 8 is a perspective view of the steering mechanism.

Rearward of the shroud 70 is a steering means 80 shown in detail in FIG. 8. Preferably, the steering means 80 comprises a plurality of plate members denoted in general by reference numbers 82, 84, 86 and 88 by way of example only.

Figure 9:
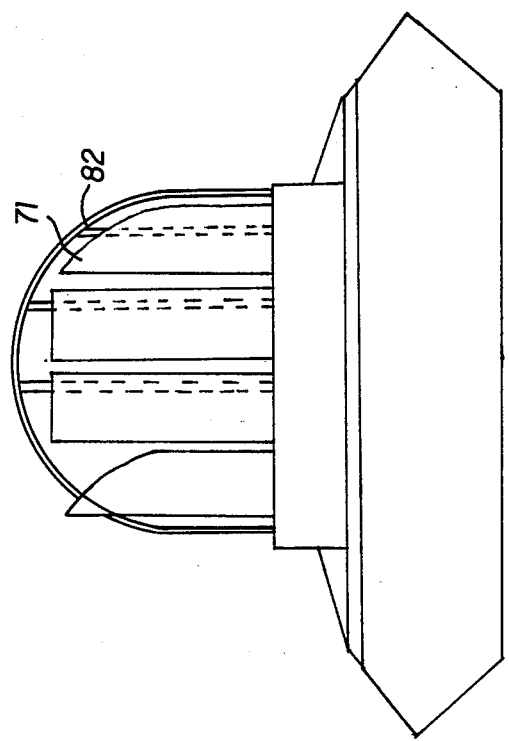
FIG. 9 is a rear view of the steering mechanism illustrating the rudder plates in various positions.

The plate members 82, 84, 86 and 88 are connected by linkage members, denoted in general by reference number 90, connecting each of the plate members 82, 84, 86 and 88 together for pivotal sideways movement upon rotation of a connecting lever 92. The connecting lever 92 is rotatably mounted at its forward end in a bracket 94 and connected to a joystick or laterally movable member 96 mounted adjacent the occupant seating position as described hereafter. The joystick 96 is mounted for lateral rotation within the bracket 94 with respect to the vehicle 10 for lateral movement. This lateral movement is transmitted through the connecting rod 92 to the steering plates 82, 84, 86 and 88 by the linkage members 90. This allows complete control and movement of the plate members 82, 84, 86 and 88 as shown in FIGS. 8 and 9. These show in solid the plate members 82, 84, 86 and 88 in the forward propulsion position in which they are substantially perpendicular to the fluid flow from the motor 60 and propulsion means 80.

FIG. 9 shows the plate members 82, 84, 86 and 88 in phantom angled for side movement or for lift-off of the vehicle 10 in which the plate members 82, 84, 86 and 88 are angled to the flow of air from the fan 64 thereby blocking a greater portion of the air flow through the shroud 70 and moving the air flow into the aperture at the rear portion of the hull 12 thereby directing a greater quantity of air into the plenum 26. Once lift-off has been attained, the plates 82, 84, 86 and 88 may be rotated to a parallel position or at any desired angle depending upon the direction in which the vehicle 10 is to be propelled thereby exerting forward or sideways force propelling the vehicle 10 in the desired direction.

The occupant of the vehicle 10 sits on a seat 100 located within the hull 12 between the side walls 24 of the hull 12. As shown in FIGS. 1 and 2, the seat 100 may have any conventional shape and is mounted on a bottom positioned pair of tracks as shown in FIGS. 7 and 9 and denoted in general by reference numbers 102 and 104. The tracks 102 and 104 are slidably mounted on corresponding tracks 106 secured to the bottom planar surface of the hull 12. Suitable locking means are provided for adjustably locking the seat 100 in any desired position along the tracks 106. This enables additional forward weight on the front end of the vehicle 10 to be provided when the seat 100 is moved to a more forward portion an the tracks 106 during lift off the vehicle 10. Once the hovercraft 10 is moving forward the seat 100 may be repositioned anywhere along the length of the tracks depending upon occupant's preferrence as shown in phantom in FIG. 2.

Figure 10:
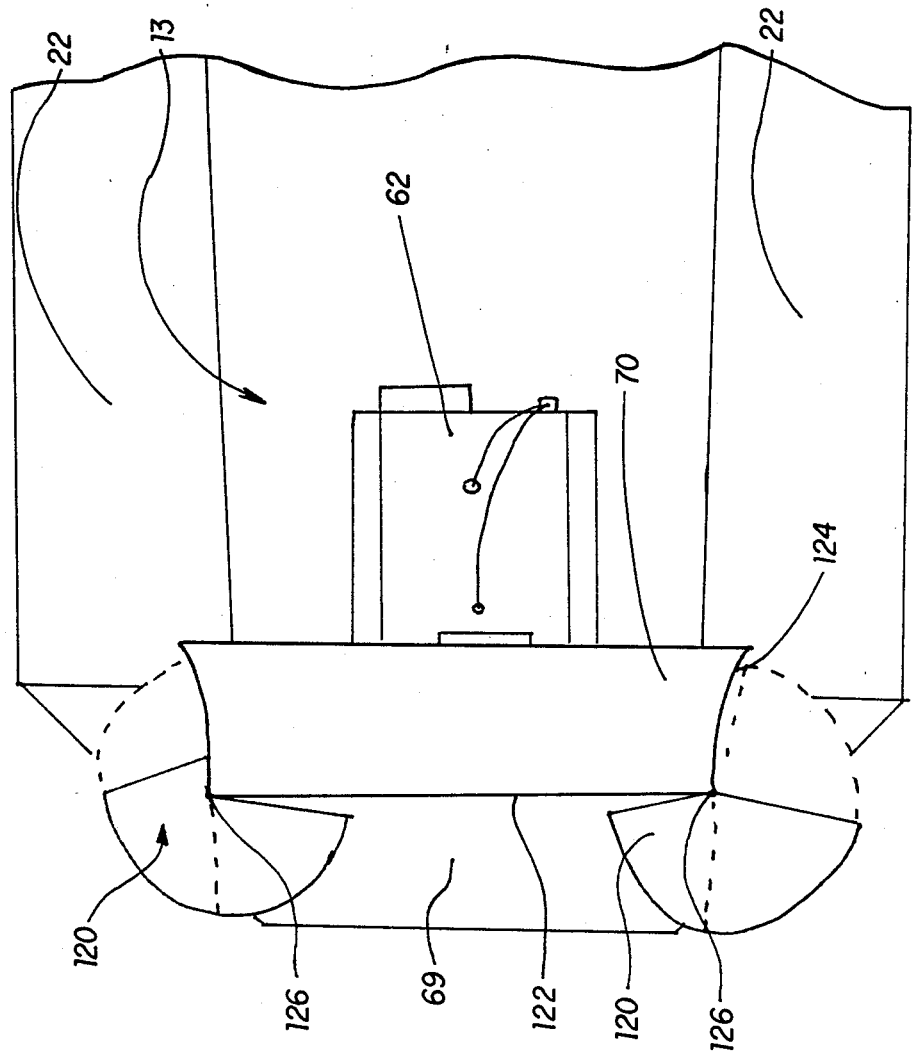
FIG. 10 is a partial plan view of the air cushion vehicle depicting the reverse thrusters.

Referring now to FIG. 10, there is illustrated yet another embodiment of the vehicle 10 of the present invention in which the steering means is provided with a pair of pivotally mounted thrusters 120 denoted in general by reference number 120. The thrusters have a hollow interior with open ends 122 and 124 spaced apart 180°. The center portions of each of the thrusters 120 is pivotally mounted by pivot pins 126 to the hull 14.

The pivot pins 126 are mounted on the outer rear edges of the shroud 70. Further, although not shown, the pair of thrusters 120 may be connected by a linkage similar to that described above and shown in FIG. 8 for the rudder plates for simultaneous left and right movement. When the thrusters 120 are in the solid position illustrated in FIG. 10, the open ends 122 of each of the thrusters 120 extend into the shroud 70 rearward of the fan 64 thereby catching a portion of the air and projecting it forward. When moved to the position shown in phantom, the open ends of the thrusters 120 extend in parallel with the output of the fan 64 thereby blocking minimal air flow from the fan 64. This allows the driver of the vehicle 10 to quickly slow down by moving the thrusters 120 into a blocking position thereby providing a measure of forward thrust on the vehicle 10. Likewise, the thrusters 120 can be moved at an angular position with respect to the fan 64 to execute any desired movement or manuever by the driver of the vehicle 10.

In summary, there has been disclosed a unique individual operated air cushion vehicle utilizing fluid or air flow from a motive or fan source through inflatable members attached to the periphery of the craft to lift the craft a short distance above a ground or surface level and propel the craft in forward or sideway directions as desired. The unique hull design having a flange extending outward at a predetermined angle from the planar bottom surface of the hull provides increased lift to enable a smaller sized vehicle to built, yet with the lift capabilities of larger vehicles. Inflatable members direct air flow through a plenum mounted within the hull from a motive fan source downward against the underlying ground or water surface to lift the vehicle. A portion of such air flow is also directed rearward through a rudder or sterring assembly to provide forward or rearward thrust as well as directional changes as desired by the operator.

What is claimed is:

1. An air cushion vehicle comprising:
   a hull, the hull including a planar bottom surface, a lower flange surface in registry with the periphery of the planar bottom surface and extending upwardly at a predetermined angle with respect to the planar surface of the hull, an upwardly contingent surface extending from the lower flange surface to a substantially vertical inclined inner wall member, the inner wall member defining an area for the occupant of the vehicle;

the bottom surface, lower flange, upper flange and inner wall defining a hollow fluid flow chamber therebetween surrounding the occupant area;

a plurality of inflatable, separate bag members attached to the peripheral surface of the vehicle and located in proximity with the lower upstanding flange of the hull;

each bag member having top and bottom surfaces, opposed ends and opposed side walls, an aperture formed in one of the ends and disposed in fluid flow communication with one of the apertures in the fluid flow chamber in the hull of the vehicle;

an aperture formed in the bottom surface of each inflatable bag member for directing fluid flow through the aperture in the end wall of each inflatable bag member and the fluid flow chamber in the hull outward against the underlying surface of the vehicle to provide lift of the vehicle above such underlying surface;

fluid propulsion means mounted on the hull of the vehicle fo rgenerating a fluid flow rearward of the vehicle for propelling the vehicle and into the fluid flow chamber for inflating the inflatable bag members to lift the vehicle off of the underlying surface;

motive powered means for driving the propulsion means; and operator actuated steering means mounted on the hull for controlling the direction of fluid flow through the propulsion means; and a plurality of apertures in the fluid flow chamber and associated with the apertures in the inflatable members to direct fluid flow therethrough.

2. The vehicle of claim 1 wherein the lower upstanding flange extends upward and outward at an acute angle between 24° to 30° with respect to the bottom planar surface of the hull.

3. The vehicle of claim 2 wherein the lower upstanding flange extends upward and outward at an acute angle of 27° with respect to the planar bottom surface of the hull.

4. The vehicle of claim 1 wherein the propulsion means includes:

a motor driven fan mounted on the hull;

the lower extent of the fan being disposed in fluid flow communication with the fluid flow chamber in the hull in the hovercraft; and a shroud surrounding the circumferential edge of the fan.

5. The vehicle of claim 4 wherein the steering means comprises:

a control lever mounted within the hull;

a plurality of spaced plate members mounted on the hull rearward of the fan, the peripheral edges of certain of the plate members conforming in shape to the shape of the shroud; and linkage means pivotally connecting the control lever to each of the plate members to provide pivotal movement of each plate member upon movement of the control lever.

6. The vehicle of claim 1 further including an occupant seat, the seat having a substantially horizontal extending seat bottom portion and upright extending seat back portion;

means for adjustably positioning the occupant's seat longitudinally within the hull; and wherein the seat bottom is positioned in close vertical proximity with the planar bottom wall surface of the hull.

7. The vehicle of claim 1 wherein certain of the inflatable members include a downwardly extending flap mounted exteriorly on each bag member.

8. An air cushion vehicle comprising:

a hull, the hull including a planar bottom surface, a lower flange surface in registry with the periphery of the planar bottom surface and extending upwardly at a predetermined angle with respect to the planar surface of the hull, an upwardly contingent surface extending from the lower flange surface to a substantially vertically inclined inner wall member, the inner wall member defining an area for the occupant of the vehicle;

the bottom surface, lower flange, upper flange and inner wall defining a hollow fluid flow chamber therebetween surrounding the occupant area;

a plurality of inflatable bag members attached to the peripheral surface of the vehicle in proximity with the lower upstanding flange of the hull each bag member having top and bottom surfaces, opposed ends and opposed side walls, an aperture formed in one of the ends and disposed in fluid flow communication with the fluid flow chamber in the hull of the vehicle;

an aperture formed in the bottom surface of each inflatable bag member for directing fluid flow through the aperture in the end wall of each inflatable bag member and the fluid flow chamber in the hull outward against the surface underlying the vehicle to provide lift of the vehicle above such underlying surface;

fluid propulsion means mounted on the hull of the vehicle for generating a fluid flow rearward of the vehicle for propelling the vehicle and into the fluid flow chamber for inflating the inflatable members to lift the vehicle off of the underlying surface;

motive powered means for driving the propulsion means;

operator actuated steering means mounted on the hull for controlling the direction of fluid flow through the propulsion means; and a plurality of apertures formed in the fluid flow chamber and associated with apertures in the inflatable members to direct fluid flow therethrough; and a substantially planar deflector mounted interiorly in each inflatable bag member between the fluid flow chamber in the hull and the aperture in the bottom surface of the inflatable bag member for directing air flow outwardly through the bottom surface of the inflatable member to maintain the inflatable bag member in an inflated state.

9. An air cushion vehicle comprising:

a hull, the hull including a planar bottom surface, a lower flange surface in registry with the periphery of the planer bottom surface and extending upwardly at a predetermined angle with respect to the planar surface of the hull, an upwardly contingent surface extending from the lower flange surface to a substantially vertically inclined inner wall member, the inner wall member defining an area for the occupant of the vehicle;

the bottom surface, lower flange, upper flange and inner wall defining a hollow fluid flow chamber therebetween surrounding the occupant area;

a plurality of inflatable bag members attached to the peripheral surface of the vehicle in proximity with the lower upstanding flange of the hull, each inflatable bag member having top and bottom surfaces, opposed ends and opposed side walls, an aperture formed in one of the ends and disposed in fluid flow communication with the fluid flow chamber in the hull of the vehicle;

an aperture formed in the bottom surface of each inflatable bag member for directing fluid flow through the aperture in the end wall of each inflatable bag member and the fluid flow chamber in the hull outward against the surface underlying the vehicle to provide lift of the vehicle above such underlying surface;

means for attaching each inflatable bag member to the peripheral surface of the hull, the attaching means including a flap mounted adjacent the top surface of each inflatable bag member and wrappable around a flange formed on the peripheral hull of the vehicle; and clamp members being insertable over the flap and flange to secure the flap end of the inflatable bag member to the hull of the vehicle;

fluid propulsion means mounted on the hull of the vehicle for generating a fluid flow rearward of the vehicle for propelling the vehicle and into the fluid flow chamber for inflating the inflatable members to lift the vehicle off of the underlying surface;

motive powered means for driving the propulsion means;

operator actuated steering means mounted on the hull for controlling the direction of fluid flow through the propulsion means; and a plurality of apertures formed in the fluid flow chamber and associated with apertures in the inflatable members to direct fluid flow therethrough.

10. an air cushion vehicle comprising:

a hull, the hull including a planar bottom surface, a lower flange surface in registry with the periphery of the planar bottom surface and extending upwardly at a predetermined angle with respect to the planar surface of the hull, an upwardly contingent surface extending from the lower flange surface to a substantially vertically inclined inner wall member, the inner wall member defining an area for the occupant of the vehicle;

the bottom surface, lower flange, upper flange and inner wall defining a hollow fluid flow chamber therebetween surrounding the occupant area;

inflatable means, attached to the peripheral surface of the vehicle and located in proximity with the lower upstanding flange for directing fluid flow through the fluid flow chamber and out of the fluid flow chamber at spaced intervals against the surface underlying the vehicle;

fluid propulsion means mounted on the hull of the vehicle for generating a fluid flow rearward of the vehicle for propelling the vehicle and into the fluid flow chamber for inflating the inflatable members to lift the vehicle off of the underlying surface;

motive powered means for driving the propulsion means;

operator actuated steering means mounted on the hull for controlling the direction of fluid flow through the propulsion means; and a plurality of apertures formed in the fluid flow chamber and associated with apertures in the inflatable members to direct fluid flow therethrough;

means, mounted in the hull and disposed rearward of the fluid propulsion means, for splitting the fluid flow generated by the fluid propulsion means into a portion flowing reaward of the fluid propulsion means and a portion flowing downward into the fluid flow chamber to inflate the inflatable means, the splitting means being pivotally attached at one end to the hull; and means for varying the position of the splitting means to vary the angle of the splitting means with respect to the planar bottom wall of the hull.

* * * * *